United States Patent [19]

Dangschat

[11] Patent Number: 5,173,777
[45] Date of Patent: Dec. 22, 1992

[54] CIRCUIT CONFIGURATION FOR INSET-IMAGE KEYING IN A TELEVISION SET HAVING ONLY ONE TUNER

[75] Inventor: Rainer Dangschat, Landsham, Fed. Rep. of Germany

[73] Assignee: Siemens Aktiengesellschaft, Munich, Fed. Rep. of Germany

[21] Appl. No.: 594,731

[22] Filed: Oct. 9, 1990

[30] Foreign Application Priority Data

Oct. 6, 1989 [EP] European Pat. Off. ........ 89 118611.6

[51] Int. Cl.⁵ .................... H04N 5/268; H04N 5/272; H04N 5/45
[52] U.S. Cl. .................................. 358/181; 358/183
[58] Field of Search ...................... 358/181, 183, 22

[56] References Cited

U.S. PATENT DOCUMENTS

| | | | |
|---|---|---|---|
| 4,249,213 | 2/1981 | Imaide | 358/183 |
| 4,623,915 | 11/1986 | Bolger | 358/22 |
| 4,816,915 | 3/1989 | Imai | 358/183 |
| 4,818,981 | 3/1989 | Beaulier | 358/183 |
| 4,855,833 | 8/1989 | Kageyama | 358/183 |

FOREIGN PATENT DOCUMENTS

| | | |
|---|---|---|
| 0222025 | 5/1987 | European Pat. Off. . |
| 2413839 | 9/1975 | Fed. Rep. of Germany . |
| 2808188 | 8/1979 | Fed. Rep. of Germany . |
| 2265235 | 10/1975 | France . |
| 61-2478A | 1/1986 | Japan . |
| 62-13172 | 1/1987 | Japan . |
| 2017452 | 10/1979 | United Kingdom . |

OTHER PUBLICATIONS

Siemens Components 26, 1988, No. 6, pp. 240-245, Bromba et al: "Featurebox 88 . . . "; p. 5, Lines 3-4 are pertinent.

Primary Examiner—Tommy P. Chin
Attorney, Agent, or Firm—Herbert L. Lerner; Laurence A. Greenberg

[57] ABSTRACT

A circuit configuration for inset-image keying in a television set having only one tuner and a picture tube includes a control device connected to the tuner for switching the tuning frequency of the tuner between a first image signal of a first program for displaying a large image and a second image signal of a second program for displaying a small image to be keyed into the large image. A switchover device is connected to the tuner and the control device. A large-image signal route for the first image signal has a large-image memory device. A small-image signal route for the second image signal has a small-image memory device. The switchover device alternately supplies the first image signal to the large-image signal route or the second image signal to the small-image signal route. A device reads out and keys the small image into the large image on the picture tube. The large-image memory device continuously supplies the large image during periods of time in which the switchover device is switched to the small-image signal route by repeated readout of the most recently stored large image. The periods of time are selected to enable the small image stored in the small-image memory device to be at least partly rewritten by new second image signals for displaying a new small image.

11 Claims, 1 Drawing Sheet

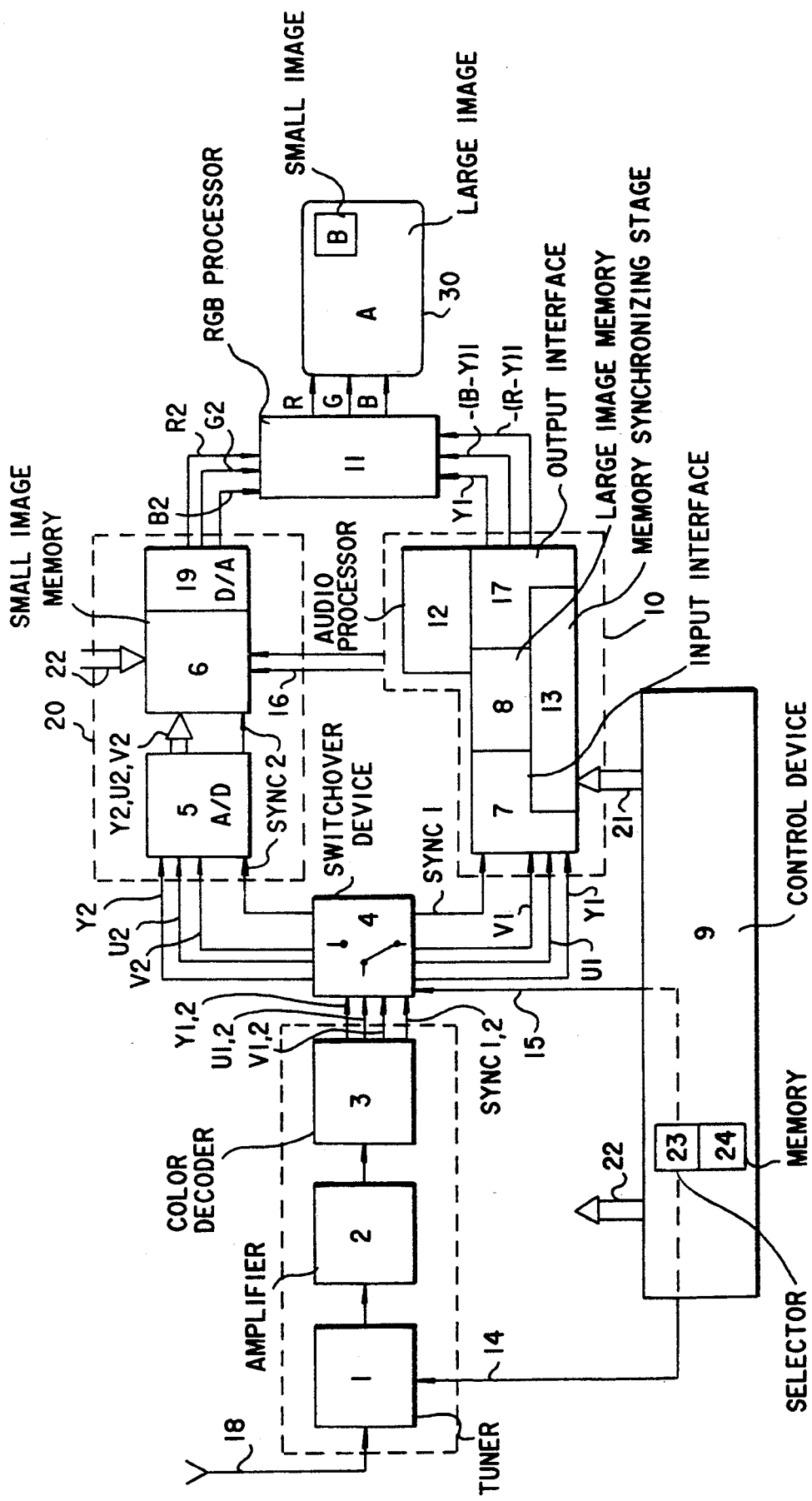

CIRCUIT CONFIGURATION FOR INSET-IMAGE KEYING IN A TELEVISION SET HAVING ONLY ONE TUNER

BACKGROUND OF THE INVENTION

1. Field of the Invention

The invention relates to a circuit configuration for on-screen image inseting or inset-image keying in a television set having only one tuner, including a control device for switching over the tuning frequency of the tuner in such a way that a first image or picture signal of a first program can be used for displaying a large image, and a second image or picture signal of a second program can be used for displaying a small image that can be keyed or set into the large image, a switchover device being connected downstream of the tuner and being controllable by the control device for supplying the first image or picture signal furnished by the tuner to a large-image signal route and alternately briefly supplying the second image or picture signal to a small-image signal route having a small-image memory device, and means for reading out and keying the small image stored in the small-image signal route into the large image on a picture tube of the television set.

2. Description of the Related Art

One such circuit configuration is known from German published, non-prosecuted application DE-OS 24 13 839, corresponding to published French application No. 2 265 235. In order to provide for inset-image keying, the familiar analog signal route (tuner, medium-frequency amplifier, video amplifier, horizontal and vertical deflection stage, and picture tube) for representing an image in a television set is expanded with a memory and switchover device, with which an image content to be reproduced for a small image to be keyed into the large image, can be stored and read out. The memory and switching device is controlled by the outputs of the medium frequency amplifier and by the horizontal deflection stage. In turn, the switch device switches over the tuner line by line between two tuning frequencies, in such a manner that during certain lines of the large image a different program, which is intended to be shown as a small image, is received. At the same time the video amplifier is connected to the memory device, as a result of which the lines of the other program being received are inscribed individually and in succession into the memory device, which is generally constructed as a CCD memory.

The memory device then outputs the information inscribed therein to the video amplifier whenever the electron beam scanning the screen arrives in the vicinity of the image cutout for the small image.

However, using that kind of circuit configuration for inset-image keying is at the very least problematic, particularly in terms of the line-by-line switchover of the tuner and the associated high switchover speed. Satisfactory picture quality for the person viewing the screen is unattainable with the known circuit configuration.

Other possibilities for inset-image keying in a television set have been proposed in German published, non-prosecuted application DE-OS 28 08 188 and U.S. Pat. No. 4,249,213, for instance. They provide two separate signal routes for receiving two television programs, each having at least one tuner with a medium frequency amplifier connected to the output side thereof. Although such a structure can be considered optimal in terms of the inset-image keying, nevertheless the high technical expense dictated by the two separate signal routes only allows it to be used for television sets in the upper price category.

It is accordingly an object of the invention to provide a circuit configuration for inset-image keying in a television set having only one tuner, which overcomes the hereinaforementioned disadvantages of the heretofore-known devices of this general type and with which the inset-image keying can be attained in a simple manner.

SUMMARY OF THE INVENTION

With the foregoing and other objects in view there is provided, in accordance with the invention, a circuit configuration for inset-image keying in a television set having only one tuner and a picture tube, comprising a control device connected to the tuner for switching the tuning frequency of the tuner between a first image or picture signal of a first program for displaying a large image and a second image or picture signal of a second program for displaying a small image to be keyed into the large image; a switchover device connected downstream of the tuner and connected to the control device; a large-image signal route connected to the switchover device for carrying the first image signal furnished by the tuner, the large-image signal route having a large-image memory device for storing a large image and from which the stored large image can be read out for large-image display; a small-image signal route connected to the switchover device for carrying the second image signal furnished by the tuner, the small-image signal route having a small-image memory device for storing a small image and from which the stored small image can be read out for small-image display; the switchover device being controlled by the control device for alternately supplying the first image signal to the large-image signal route and briefly supplying the second image signal to the small-image signal route; and means connected between the signal routes and the picture tube for reading out and keying the small image into the large image on the picture tube; the large-image memory device continuously supplying the large image during periods of time in which the switchover device is switched to the small-image signal route by repeated readout of the most recently stored large image; and the control device having means for selecting the periods of time to enable the small image stored in the small-image memory device to be at least partly rewritten by new second image signals for displaying a new small image.

In accordance with another feature of the invention, the large-image memory device and/or the small-image memory device is at least a half-frame memory.

In accordance with a further feature of the invention, the switchover device receives image signals having a luminance signal component and chrominance signal components.

In accordance with an added feature of the invention, the switchover device receives the image signals in the form of CSCC signals.

In accordance with an additional feature of the invention, the control device has means for switching over the switchover device to the small-image signal route precisely long enough for the tuner to jump to a tuning frequency for the second program, for a new half frame to be inscribed in the small-image memory device, and for the tuning frequency of the tuner to jump back to the first program.

In accordance with yet another feature of the invention, the switchover device switches the image signals for the second program to the small-image signal route for a maximum of 100 msec for small-image display.

In accordance with yet a further feature of the invention, the small image is formed from successive still pictures being renewed at a frequency of up to 20 Hz.

In accordance with yet an added feature of the invention, there is provided a digital audio signal processing device for bridging the period of time in which the switchover device is switched to the small-image signal route and avoiding audio interruptions.

In accordance with yet an additional feature of the invention, the control device includes means for storing tuning voltages and means for feeding the tuning voltages to the tuner for switching over between tuning frequencies for the first and second programs.

In accordance with a concomitant feature of the invention, the small-image memory device is part of the large-image memory device.

Accordingly, the invention is essentially based on the fact that the picture signals for both the small image and the large image are inscribed in different memory devices, and are read out again jointly, at the correct rate, for inset-image keying or on-screen insetting. Both memory devices are supplied from a common signal route having only one tuner, which is switched over between two tuning frequencies of a first and a second program, and which is followed by a switchover device. If the tuner is set to the tuning frequency for the program for displaying the large image, then the large-image signal route is supplied with image signals through the switchover device. In contrast, if the tuner is set to the second tuning frequency for displaying the second program as a small image, the picture signals reach the small-image signal route through the switchover device. The switchover of both the tuner and the switchover device is performed by a control device.

The cycling times of the switchover device are selected in such a way that for the majority of the time, the large-image signal route is supplied with picture signals of the first program, and a switchover to the small-image signal route is made only during relatively brief time intervals. During the switchover intervals, the large image continues to be supplied from its own large-image memory device, for instance by repeated readout of the most recently stored half frame from the large-image memory device. The period of time need merely suffice to switch the tuner over to the second tuning frequency, so that the picture signals stored in the small-image memory device can be rewritten with new picture signals, and so that the tuner can be switched back to the first tuning frequency again. A large image is thus obtained that has relatively small, but not problematic, interruptions in motion. Such interruptions are common at present when recoding from 50 to 60 Hz is performed, and the viewer finds them tolerable.

In contrast, the small image has greatly reduced motion resolution. It is made up of still pictures, which are indexed onward, for instance, at a frequency of from 5 to 20 Hz.

Other features which are considered as characteristic for the invention are set forth in the appended claims.

Although the invention is illustrated and described herein as embodied in a circuit configuration for inset-image keying in a television set having only one tuner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a block circuit diagram of a circuit according to the invention.

DESCRIPTION OF THE PREFERRED EMBODIMENTS

Referring now in detail to the single FIGURE of the drawing, in which deflection devices that television sets require have been omitted for the sake of simplicity, there is seen a basic circuit diagram of a circuit configuration for inset-image or on-screen inset keying in a television set having only a single tuner 1, which is connected, in a known manner, on the input side to a reception antenna 18 and on the output side to a medium-frequency amplifier 2 as well as a color decoder 3 connected to the output side of the medium-frequency amplifier 2. The following discussion assumes, for instance, that the image or picture signal can be picked up at the output of the color decoder 3, in the form of luminance signals Y and chrominance signals U, V. Naturally, the image or picture signal may also be present in the form of a CSCC signal.

According to the invention, the tuner 1 can be switched over between two receiving frequencies by a control signal, for instance by the application of two different tuning voltages, which may be stored in a control device 9 to be described below, in such a way that either first image or picture signals Y1, U1, V1 of a first program or second image or picture signals Y2, U2, V2 of a second program, along with synchronizing signals SYNC 1, 2 belonging to them, are present at the output of the color decoder 3.

According to the invention, the output of the color decoder 3 is connected to the input of a switchover device 4, that is suitably a video multiplexer, which switches the first image or picture signal Y1, U1, V1 to a large-image or picture signal route 10 and the second image or picture signal Y2, U2, V2 to a small-image or picture signal route 20, depending on which of the two receiving frequencies the tuner 1 is tuned to at the moment. The switchover of the tuner 1 and of the switchover device 4 is controlled by the aforementioned control device 9, which is connected to the switchover device 4 and to the tuner 1 through control lines 14, 15 for this purpose.

If the tuner 1 is switched to the first receiving frequency to receive image or picture signals Y1, U1, V1 of the first program and the switchover device 4 accordingly assumes the switch position shown in FIG. 1, then the image or picture signals Y1, U1, V1 reach the large-image signal route 10. The central component of the large-image signal route 10 is a large-image memory device 8, in particular a half-frame memory in the form of dynamic RAMs. Besides this large-image memory device 8, the large-image signal route 10 also includes an input interface 7, an output interface 17, and a memory synchronizing stage 13, which essentially serve to perform the A/D and D/A conversion of the image or picture signals Y1, U1, V1.

The structure and operation of this large-image signal route 10 is already known and is described in detail, for instance in the publication Siemens Components 26, 1988, No. 6, pp. 240-245, so that they need not be described in further detail herein.

In the exemplary embodiment presented herein, the image or picture signals for a large image or picture A to be displayed on a picture tube 30 are available at the output of digital large-image signal route 10 in the form of luminance signals Y1, and color difference signals $-(B-Y)1, -(R-Y)2$.

In contrast, if the tuner 1 is switched over to the second receiving frequency, and if the second image or picture signals Y2, U2, V2 are consequently present at the input of the switchover device 4, then the control device 9 switches them to the small-image signal route 20, which essentially includes a small-image memory device 6, in particular a half-frame memory. The small-image signal path 20 also has an A/D converter stage 5 connected between the small-image memory device 6 and the switchover device 4. Through the use of the converter stage 5, the analog image or picture signals Y2, U2, V2 pertaining to the small image are digitized and can be inscribed as picture data into the small-image memory device 6. A D/A converter stage 19 is provided at the output of the small-image memory device 6, by means of which the stored image or picture signals can, for instance, be converter into analog RGB or YUV signals. The small-image signal route 20 is moreover constructed in such a way that the second program can be displayed as a reduced-size image. To this end, a decimation of the second image or picture signals Y2, U2, V2 is, for instance, provided. One possible embodiment of the small-image signal route 20 uses Siemens integrated components SDA 9087 as a triple D/A converter stage and SDA 9088 as an inset-image processor, the latter including both the small-image memory device 6 and the D/A conversion.

The circuit configuration according to the invention also has means by which a small image or picture B stored in the small-image signal route can be read out and keyed into the large image A on the screen 30 of the television set. The image or picture signals that can be picked up at the output of the small-image signal route 20, which are R2, G2 and B2, for example, herein, as well as the image or picture signals Y1, $-(B-Y)1$, $-(R-Y)1$ present at the output side of the large-image signal route 20, reach an RGB processor 11, for example, such as the Philips integrated component TDA 4580, by way of which keying of the small image B into the large image A is possible. To this end, the mixed image or picture signals are supplied to the picture tube 30 in RGB form. Synchronizing between the large-image signal route 10 and the small-image signal route 20 is effected through synchronizing signals carried over control lines 16, which are connected between the large-image signal route 10 and the small-image signal route 20. To this end, the control lines 16 can carry arbitrary H and V pulses for synchronizing the small image B to the large image A.

The aforementioned control device 9 can activate both the large-image memory device 8 and the small-image memory device 6 through connecting lines 21 and 22, such as an I²C bus. The control device 9 additionally assures the switchover of both of the switchover device 4 and tuner 1 at the correct time, in such a manner that a small image B stored in the small-image memory device 6 is at least partly rewritten by new second image or picture signals Y2, U2, V2, in order to represent a new small image B. Advantageously, a new half-frame is inscribed in the small-image memory device 6. During these periods of time, the large image A continues to be supplied from the large-image memory device 8, by repeated readout of the most recently stored large image.

The period of time in which the switchover device 4 is switched to the small-image signal route 20 is selected to be precisely long enough for the tuner 1 to jump to the tuning frequency for the second program, for a new half image to be inscribed in the small-image memory device 6, and for the tuning frequency of the tuner 1 to jump back to the first program. The period of time is a maximum of 100 msec.

In contrast, during the majority of time, the tuner is switched to the first receiving frequency and thus to the first program, and the switchover device 4 is connected to the large-image signal route 10. The result for the viewer of the picture tube 30 is a large image A, into which a small image B has been keyed. The small image B includes successive still pictures, which are renewed at a frequency of up to 20 Hz, for example. The result is consequently a large image A, which has relatively small but still not disturbing interruptions in motion, into which a small image B has been keyed in the form of a still picture, the picture content of which is renewed at a frequency of up to 20 Hz.

Once the switchover device 4 has switched to the small-image signal route 20, then naturally the sound for the large image A is interrupted. In order to solve the resultant problems, according to a further feature of the invention, a digital audio signal processing circuit 12 may be provided in the television set, in which the absent audio signal is bridged during the audio interruption.

However, it can be assumed that in general audio interruptions in the range of up to 50 msec are tolerated by the television viewer, because the human ear is relatively slow.

With the circuit configuration presented herein, it is simple to provide inset-image or on-screen inset keying in television sets having only one tuner. The result is that the television viewer sees a large image A, into which a small image B with reduced motion resolution has been keyed. The invention makes use of the well-known restricted perception of the human eye and ear, and accordingly offers no more than what the average final consumer can in fact perceive.

In closing, it should also be noted that it is not compulsory to construct the small-image memory device 6 and large-image memory device 8 separately. Instead, it is possible for the small-image memory device to be constructed as part of the large image memory device 8, as can already been done in memories for still pictures in a large motion picture.

I claim:

1. Circuit configuration for inset-image keying in a television set having only one tuner and a picture tube, comprising
    a control device connected to the tuner for switching the tuning frequency of the tuner between a first image signal of a first program for displaying a large image and a second image signal of a second program for displaying a small image to be keyed into the large image;

a switchover device connected downstream of the tuner and connected to said control device;

a large-image signal route connected to said switchover device for carrying the first image signal furnished by the tuner, said large-image signal route having a large-image memory device for storing said large image and from which the stored large image can be read out for the large-image display;

a small-image signal route connected to said switchover device for carrying the second image signal furnished by the tuner, said small-image signal route having a small-image memory device for storing said small image and from which the stored small image can be read out for the small-image display;

said switchover device being controlled by said control device for alternately supplying the first image signal to said large-image signal route and briefly supplying the second image signal to said small-image signal route; and means connected between said signal routes and the picture tube for reading out and keying said small image into said large image on the picture tube;

said large-image memory device continuously supplying the large image during periods of time in which said switchover device is switched to said small-image signal route by repeated readout of the most recently stored large image;

said control device having means for selecting said periods of time to enable the small image stored in said small-image memory device to be at least partly rewritten by new second image signals for displaying a new small image; and said control device having means for switching over said switchover device to said small-image signal route precisely long enough for the tuner to jump to a tuning frequency for the second program, for a new half frame to be inscribed in said small-image memory device, and for the tuning frequency of the tuner to jump back to the first program.

2. Circuit configuration according to claim 1, wherein said large-image memory device is at least a half-frame memory.

3. Circuit configuration according to claim 1, wherein said small-image memory device is at least a half-frame memory.

4. Circuit configuration according to claim 1, wherein said switchover device receives image signals having a luminance signal component and chrominance signal components.

5. Circuit configuration according to claim 1, wherein said switchover device receives said image signals in the form of CSCC signals.

6. Circuit configuration according to claim 1, wherein said switchover device switches the second image signal for the second program to said small-image signal route for a maximum of 100 msec for the small-image display.

7. Circuit configuration according to claim 1, wherein said small image is formed from successive still pictures being renewed at a frequency of up to 20 Hz.

8. Circuit configuration according to claim 1, including a digital audio signal processing device for bridging the period of time in which said switchover device is switched to said small-image signal route and avoiding audio interruptions.

9. Circuit configuration according to claim 1, wherein said control device includes means for storing tuning voltages and means for feeding the tuning voltages to the tuner for switching over between tuning frequencies for the first and second programs.

10. Circuit configuration according to claim 1, wherein said small-image memory device is part of said large-image memory device.

11. Circuit configuration for inset-image keying in a television set having only one tuner and a picture tube, comprising a control device connected to the tuner for switching the tuning frequency of the tuner between a first image signal of a first program for displaying a large image and a second image signal of a second program for displaying a small image to be keyed into the large image;

a switchover device connected downstream of the tuner and connected to said control device;

a large-image signal route connected to said switchover device for carrying the first image signal, said large-image signal route having a large-image memory device;

a small-image signal route connected to said switchover device for carrying the second image signal, said small-image signal route having a small-image memory device;

said switchover device being controlled by said control device for alternately supplying the first image signal to said large-image signal route and the second image signal to said small-image signal route; and means connected between said large image signal and small image signal routes and the picture tube for reading out and keying the small image into the large image on the picture tube;

said large-image memory device repeatedly reading out the most recently stored large image when said switchover device is switched to said small image signal route and the small image stored in said small-image memory device is at least partly rewritten by new second image signals for displaying a new small image; and said control device having means for switching over said switchover device to said small-image signal route precisely long enough for the tuner to jump to a tuning frequency for the second program, for a new half frame to be inscribed in said small-image memory device, and for the tuning frequency of the tuner to jump back to the first program.

* * * * *